United States Patent
Ueda et al.

(10) Patent No.: US 6,770,405 B2
(45) Date of Patent: Aug. 3, 2004

(54) COLOR FILTER ARRAY HAVING A BLUE FILTER LAYER

(75) Inventors: Yuuji Ueda, Izumiotsu (JP); Kazuhiro Machiguchi, Toyonaka (JP); Hiroki Endo, Tokyo (JP); Taichi Natori, Tokyo (JP); Toyomi Jinwaki, Kokubu (JP)

(73) Assignees: Sumitomo Chemical Company, Limited, Osaka (JP); Sony Corporation, Tokyo (JP)

( * ) Notice: Subject to any disclaimer, the term of this patent is extended or adjusted under 35 U.S.C. 154(b) by 216 days.

(21) Appl. No.: 09/893,772

(22) Filed: Jun. 29, 2001

(65) Prior Publication Data

US 2002/0042008 A1 Apr. 11, 2002

(30) Foreign Application Priority Data

Jun. 30, 2000 (JP) .................................... 2000-198915

(51) Int. Cl.[7] .............................. G03F 7/00; G02B 5/20
(52) U.S. Cl. ........................................ 430/7; 430/270.1
(58) Field of Search .................................. 430/7, 270.1

(56) References Cited

U.S. PATENT DOCUMENTS

| | | | | |
|---|---|---|---|---|
| 4,311,783 A | * | 1/1982 | Dessauer ................. | 430/270.1 |
| 4,808,501 A | | 2/1989 | Chiulli .......................... | 430/7 |
| 4,812,354 A | * | 3/1989 | Sugiyama et al. ....... | 428/32.84 |
| 4,876,165 A | * | 10/1989 | Brewer et al. ................. | 430/7 |
| 5,423,907 A | | 6/1995 | Morikubo et al. | |
| 5,811,209 A | * | 9/1998 | Eida et al. ...................... | 430/7 |
| 5,876,895 A | | 3/1999 | Hishiro et al. .............. | 430/191 |
| 6,203,951 B1 | * | 3/2001 | Furukawa et al. ............. | 430/7 |
| 6,258,498 B1 | * | 7/2001 | Kawahara et al. ............ | 430/66 |
| 6,340,545 B1 | * | 1/2002 | Murai et al. .................... | 430/7 |

FOREIGN PATENT DOCUMENTS

| | | | | |
|---|---|---|---|---|
| EP | 08327812 A | 12/1996 | | |
| EP | 08327998 | 12/1996 | | |
| JP | 58180509 A | 10/1983 | | |
| JP | 02014264 A | 1/1990 | | |
| JP | 5257319 A | 10/1993 | | |
| JP | A635182 | 2/1994 | | |
| JP | 6-75375 | * 3/1994 | .......... | G03F/7/038 |
| JP | 8-327998 | * 12/1996 | .......... | G02F/1/335 |
| JP | 10288708 | 10/1998 | | |

OTHER PUBLICATIONS

English language machine translation of JP 6-75375.*
English language translation of JP 8-327998.*

* cited by examiner

*Primary Examiner*—Mark F. Huff
*Assistant Examiner*—Amanda Walke
(74) *Attorney, Agent, or Firm*—Birch, Stewart, Kolasch & Birch, LLP

(57) ABSTRACT

A color filter array having a blue filter layer on a substrate wherein the blue filter layer comprises triallylmethane dye showing its absorption maximum at a wavelength within the range of from 550 to 650 nm; and has a transmittance at a wavelength of 450 nm of 70% or more and that at 650 nm of 5% or less is provided; and the color filter array shows excellent spectroscopic characteristics with respect to blue light and has a blue filter layer excellent in light fastness.

7 Claims, 4 Drawing Sheets

COLOR FILTER ARRAY HAVING A BLUE FILTER LAYER

This application claims priority of Japanese Application No. 2000-198915, filed Jun. 30, 2000, the entire contents of which are hereby incorporated by reference.

BACKGROUND OF THE INVENTION

The present invention relates to color filter arrays for solid-state image devices or liquid crystal display devices, and to a method for producing the same.

As a color filter array formed on a device such as a solid-state image device or a liquid crystal display device, there has been known a color filter array (2) constituted of a red filter layer (R), a green filter layer (G), and a blue filter layer (B) formed so as to be adjoining to each other in the same plane of a substrate (1) (FIG. 1). In the color filter array (2), the filter layers (R), (G), (B) are arranged in a striped pattern (FIG. 2) or a lattice-like pattern (mosaic) (FIG. 3).

A variety of processes for producing such color filter arrays have been proposed. Among them, the so-called "color resist method" is in wide practical use. In the color resist method, the patterning is effected by exposing a photosensitive resin composition comprising colorants to light and developing, and the patterning is repeated in sequence for the required number of times.

As the photosensitive resin composition which is employed in the color resist method, those employing pigments as colorants are in wide use. However, such pigments are not suitable for the formation of fine or minute patterns, for they are granular and do not dissolve in developers, and developing residue is generated.

As a photosensitive resin composition for obtaining a finely patterned color filter array, a photosensitive resin composition employing dyes as colorants has also been known. For example, Japanese Patent Application Laid-Open No. 6-75375 discloses a negative photosensitive resin composition comprising dyes, and Japanese Patent Publication No. 7-111485 discloses a positive photosensitive resin composition comprising 10 to 50%, on a dry weight basis, of a dye soluble in the solvent used in the positive photosensitive resin composition. (Hereinafter, "JP-A-" is used for indicating Japanese Patent Application Laid-Open, and "JP-B-" is used for indicating Japanese Patent Publication.) Colorants comprised in photosensitive resin compositions used for producing color filter arrays, such as those described above, are required to have the following two properties.

(1) Good spectroscopic characteristics, that is, showing sufficient absorption within the predetermined visible ray region and no unnecessary absorption in the other region.

(2) Good light fastness, that is, no burn-in due to the decolorization of dyes under normal operating conditions However, none of the dyes employed in conventional photosensitive resin compositions used for forming a blue filter layer has both of the above-described two properties.

The inventors of the present invention have made intensive and extensive studies to develop a color filter array having a blue filter layer having good spectroscopic characteristics as well as good light fastness. As a result, they have found that the use of a specific dye realizes the formation of a blue filter layer satisfactory both in spectroscopic properties and light fastness. The present invention was accomplished based on this finding.

SUMMARY OF THE INVENTION

The invention provides a color filter array having a blue filter layer on a substrate wherein the blue filter layer comprises a triallylmethane dye (hereinafter, referred to as "dye (I)") showing its absorption maximum at a wavelength within the range of from 550 to 650 nm; and has a transmittance at a wavelength of 450 nm of 70% or more and that at 650 nm of 5% or less.

The invention also provides a process for producing the color filter array.

BRIEF DESCRIPTION OF THE DRAWINGS

FIG. 1 is a schematic view showing a cross-section of a color filter array in which a green filter layer, a red filter layer, and a blue filter layer are provided in the same plane of a substrate.

FIG. 2 is a plane schematic view of a color filter array provided with a green filter layer, a red filter layer, and a blue filter layer arranged in a striped pattern.

FIG. 3 is a plane schematic view of a color filter array provided with a green filter layer, a red filter layer, and a blue filter layer arranged in a mosaic pattern.

FIG. 4 is a plane schematic view of the color filter array obtained in Example 1.

FIG. 5 is a plane schematic view of the color filter array obtained in Example 1.

FIG. 6 is a schematic view illustrating the steps in Example 5.

DESCRIPTION OF REFERENCE NUMERALS

Figure 1:
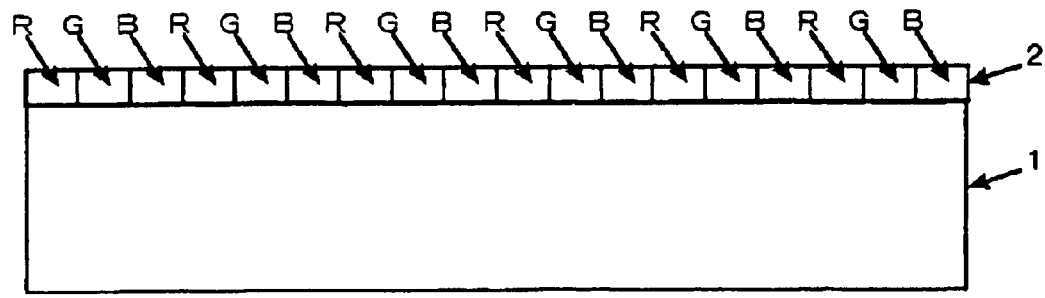
[FIG. 1]
Figure 2:
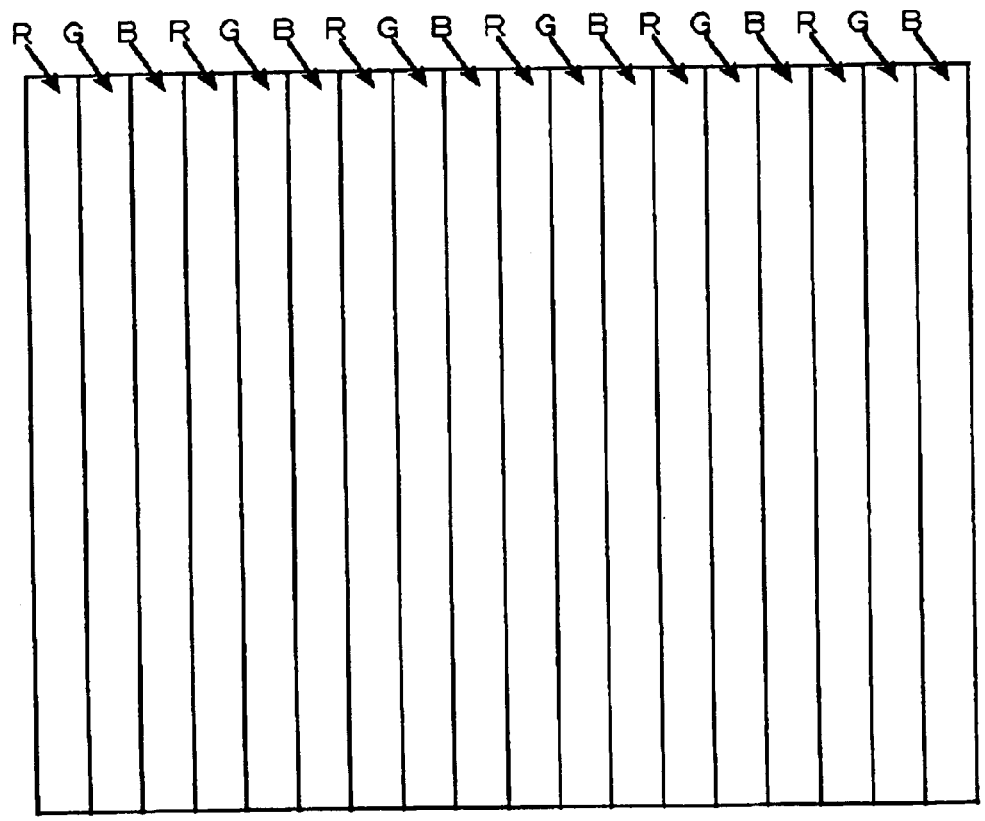
[FIG. 2]

1: substrate
2: color filter array
3: over coating film
4: polysilicon electrode
5: sensor
6: V resistor
7: light-shielding film
8: passivation film
9: microlens
R: red filter layer
G: green filter layer
B: blue filter layer Detailed Description As the substrate used in the color filter of the present invention, a silicon wafer and a transparent inorganic glass plate are exemplified. On the silicone wafer, a charge coupled device may be formed.

The color filter array of the invention has a blue filter layer on its substrate.

Examples of the dye (I) include compounds represented by the general formula (I):

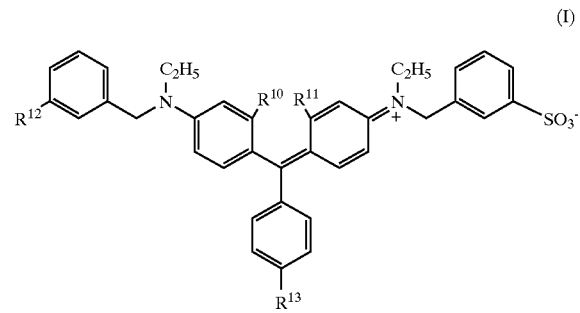

(I)

wherein $R^{10}$ and $R^{11}$ each independently represents a hydrogen atom or an alkyl group having 1 to 3 carbon atoms; $R^{12}$ represents a hydrogen atom or a sulfonic acid group; and $R^{13}$ represents a hydrogen atom, a sulfonic acid group, a carboxylic acid group, an alkyl group having 1 to 3 carbon atoms, an alkoxyl group having 1 to 3 carbon atoms, or a group represented by the general formula (1):

—$NR^{14}R^{15}$     (1)

wherein $R^{14}$ and $R^{15}$ each independently represents a hydrogen atom, a phenyl group, an alkyl group having 1 to 3 carbon atoms, or a phenyl group substituted at the p-position with an alkoxyl group having 1 to 3 carbon atoms; and salts thereof.

In a compound represented by the general formula (I), examples of the alkyl group having 1 to 3 carbon atoms represented by $R^{10}$, $R^{11}$, $R^{13}$, $R^{14}$, or $R^{15}$ include methyl group, ethyl group, and propyl group. Examples of the alkoxyl group having 1 to 3 carbon atoms represented by $R^{13}$ include methoxy group, ethoxy group, and propoxy group. Examples of the phenyl group substituted at the p-position with an alkoxyl group having 1 to 3 carbon atoms and represented by $R^{14}$ or $R^{15}$ include p-methoxyphenyl group, p-ethoxyphenyl group, and p-propoxyphenyl group.

The dye (I) maybe a compound represented by the general formula (I) or its salt. Examples of the salt are those with alkaline metals such as sodium and potassium or with amines such as triethylamine, 2-ethylhexylamine and 1-amino-3-phenylbutane. The salt may be formed at the position of —$SO_3$— residue or at an acid group represented by $R^{12}$ or $R^{13}$.

Examples of the dye (I) include C. I. Acid Blue 7, C. I. Acid Blue 83, C. I. Acid Blue 90, C. I. Solvent Blue 38, C. I. Acid Violet 17, C. I. Acid Violet 49 and C. I. Acid Green 3. These dyes (I) are used singly or in combination. These dyes (I) have their absorption maximum at a wavelength within the range of from 550 to 650 nm.

The dye (I) can be dissolved in the photosensitive resin composition at a high concentration. As a result, a blue filter layer having sufficient spectroscopic characteristics can be obtained by using the same, even when the filter layer has small thickness.

The amount of the dye (I) comprised therein is controlled so that transmittance of the filter is 70% or more at a wavelength of 450 nm and 5% or less at 650 nm.

For improving light fastness and controlling the color, that is, control of its spectroscopic characteristics, other dyes may be incorporated into the blue filter layer. For example, the blue filter layer may comprise a copper phthalocyanine dye (hereinafter, referred to as "dye (II)") having its absorption maximum at a wavelength of 600 to 700 nm.

Examples of the dye (II) include compounds represented by the general formula (II):

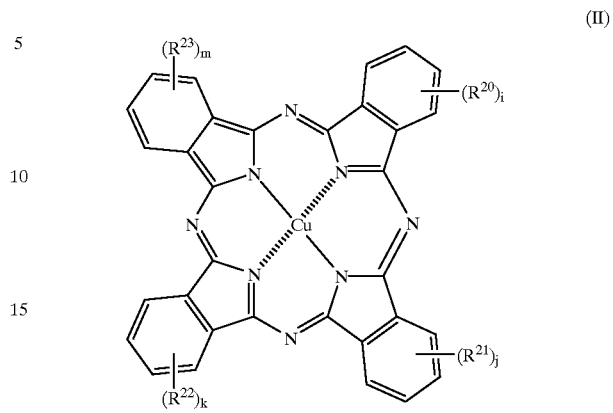

(II)

wherein $R^{20}$, $R^{21}$, $R^{22}$ and $R^{23}$ each independently represents a sulfonic acid group, a sulfonamide group, or a sulfamoyl group represented by the general formula (2):

$R^{24}HN—SO_2—$     (2)

wherein $R^{24}$ represents an alkyl group having 2 to 20 carbon atoms, a cyclohexylalkyl group wherein the alkyl chain has 2 to 12 carbon atoms, an alkylcyclohexyl group whein the alkyl chain has 1 to 4 carbon atoms, an alkyl group which has 2 to 12 carbon atoms and has been substituted with an alkoxyl group having 2 to 12 carbon atoms, an alkylcarboxylalkyl group represented by the general formula (2-1):

$R^{25}—CO—O—R^{26}—$     (2-1)

wherein $R^{25}$ represents an alkyl group having 2 to 12 carbon atoms, and $R^{26}$ represents an alkylene group having 2 to 12 carbon atoms, an alkyloxycarbonylalkyl group represented by the general formula (2-2):

$R^{27}—O—CO—R^{28}—$     (2-2)

wherein $R^{27}$ represents an alkyl group having 2 to 12 carbon atoms, and $R^{28}$ represents an alkylene group having 2 to 12 carbon atoms, a phenyl group substituted with an alkyl group having 1 to 20 carbon atoms, or an alkyl group which has 1 to 20 carbon atoms and has been substituted with phenyl group; and each of i, j, k, m independently represents an integer of 0 to 2 with the proviso that $i+j+k+m \leq 4$; and salts thereof. Incorporation of the dye (II) improves the light fastness of the blue filter layer, that is, the ability of preventing so-called "burn-in" due to the decolorization of dyes under normal operating conditions.

Examples of the alkyl group having 2 to 20 carbon atoms represented by $R^{24}$ in the general formula (II) include ethyl group, propyl group, n-hexyl group, n-nonyl group, n-decyl group, n-dodecyl group, 2-ethylhexyl group, 1,3-dimethylbutyl group, 1-methylbutyl group, 1,5-dimethylhexyl group, and 1,1,3,3-tetramethylbutyl group. Examples of the cyclohexylalkyl group wherein the alkyl chain has 2 to 12 carbon atoms include cyclohexylethyl group, 3-cyclohexylpropyl group, and 8-cyclohexyloctyl group. Examples of the alkylcyclohexyl group wherein the alkyl chain 1 to 4 carbon atoms include 2-ethylcyclohexyl group, 2-propylcyclohexyl group, and 2-(n-butyl) cyclohexyl group. Examples of the $C_{2-12}$ alkyl group substituted with an alkoxyl group having 2 to 12 carbon atoms include 3-ethoxy-n-propyl group, propoxypropyl group, 4-ethoxy-n-butyl group, 3-methyl-n-hexyloxyethyl group, and 3-(2-ethylhexyloxy)propyl group. Examples of the phenyl group substituted with an alkyl group having 1 to 20 carbon atoms include o-isopropylphenyl group. Examples of the $C_{1-20}$ alkyl group substituted with phenyl group include DL-1-phenylethyl group, benzyl group, and 3-phenyl-n-butyl group.

Examples of the alkyl group having 2 to 12 carbon atoms represented by $R^{25}$ in the general formula (2-1) and $R^{27}$ in the general formula (2-2) include ethyl group, propyl group, n-hexyl group, n-nonyl group, n-decyl group, n-dodecyl group, 2-ethylhexyl group, 1,3-dimethylbutyl group, 1-methylbutyl group, 1,5-dimethylhexyl group, and 1,1,3,3-tetramethylbutyl group. Examples of the $C_{2-12}$ alkylene group represented by $R^{26}$ or $R^{28}$ include dimethylene group, trimethylene group, tetramethylene group, pentamethylene group and hexamethylene group.

The dye (II) may be a compound represented by the general formula (II) or salt thereof. Examples of the salt include those with alkaline metals such as sodium and potassium or with amines such as trimethylamine, 2-ethylhexylamine, and 1-amino-3-phenylbutane. When the groups $R^{20}$, $R^{21}$, $R^{22}$, or $R^{23}$ is a sulfonic acid group, the salt is one that is formed at the position of the sulfonic acid group.

Examples of the dye (II) include C. I. Solvent Blue 25, C. I. Solvent Blue 55, C. I. Solvent Blue 67, C. I. Acid Blue 249, and C. I. Direct Blue 86. These are used singly or in combination. These dyes (II) have their absorption maximum at a wavelength within the range of from 600 to 700 nm.

When the dye (II) is used, the amounts of the dye (II) comprised in the blue filter is controlled so that transmittance of the filter is 70% or more at a wavelength of 450 nm and 5% or less at 650 nm. For example, the content of a dye (I) per a total of 100 parts by weight of the dye (I) and the dye (II) is usually 30 to 70 parts by weight, preferably 40 to 60 parts by weight. When the content of the dye (I) is less than 30 parts by weight, the spectroscopic characteristics to blue light tends to be insufficient. When the content of the dye (I) exceeds 70 parts by weight, the light fastness tends to be insufficient.

The blue filter layer may further comprise a xanthene dye (hereinafter, referred to as "dye (III)") having its absorption maximum at a wavelength of 500 to 600 nm.

Examples of the dye (III) include compounds represented by the general formula (III):

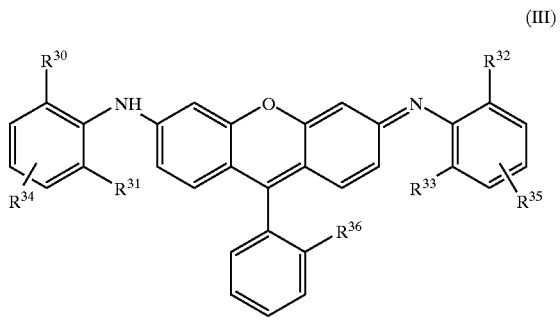

(III)

wherein $R^{30}$, $R^{31}$, $R^{32}$, and $R^{33}$ each independently represents a hydrogen atom or an alkyl group having 1 to 3 carbon atoms; and $R^{34}$, $R^{35}$, and $R^{36}$ each independently represents a sulfonic acid group or a group represented by the general formula (3):

$$R^{37}HNSO_2— \quad (3)$$

wherein $R^{37}$ represents an alkyl group having 2 to 20 carbon atoms, a cyclohexylalkyl group wherein the alkyl chain has 2 to 12 carbon atoms, an alkylcyclohexyl group wherein the alkyl chain has 1 to 4 carbon atoms, an alkyl group which has 2 to 12 carbon atoms and is substituted with an alkoxyl group having 2 to 12 carbon atoms, and an alkylcarboxylalkyl group represented by the general formula (3-1):

$$R^{380}—CO—O—R^{381} \quad (3-1)$$

wherein $R^{380}$ represents an alkyl group having 2 to 12 carbon atoms, and $R^{381}$ represents an alkylene group having 2 to 12 carbon atoms, an alkyloxycarbonylalkyl group represented by the general formula (3-2):

$$R^{390}—O—CO-R^{391} \quad (3-2)$$

wherein $R^{390}$ represents an alkyl group having 2 to 12 carbon atoms, and R391 represents an alkylene group having 2 to 12 carbon atoms, a phenyl group substituted with an alkyl group having 1 to 20 carbon atoms, or an alkyl group which has 1 to 20 carbon atoms and is substituted with a phenyl group; and salts thereof.

By incorporating the dye (III), the spectroscopic characteristics of blue filter is controlled so that transmittance of the filter is 15% or less at a wavelength of 535 nm.

Examples of the alkyl group having 1 to 3 carbon atoms represented by $R^{30}$, $R^{31}$, $R^{32}$, or $R^{33}$ in the general formula (III) include methyl group, ethyl group, and propyl group. Examples of the alkyl group having 2 to 20 carbon atoms represented by $R^{37}$ are ethyl group, propyl group, n-hexyl group, n-nonyl group, n-decyl group, n-dodecyl group, 2-ethylhexyl group, 1,3-dimethylbutyl group, 1-methylbutyl group, 1,5-dimethylhexyl group, and 1,1,3,3-tetramethylbutyl group. Examples of the cyclohexylalkyl group wherein the alkyl chain has 2 to 12 carbon atoms include cyclohexylethyl group, 3-cyclohexylpropyl group, and 8-cyclohexyloctyl group. Examples of the alkylcyclohexyl group wherein the alkyl chain 1 to 4 carbon atoms include 2-ethylcyclohexyl group, 2-propylcyclohexyl group, and 2-(n-butyl)cyclohexyl group. Examples of the $C_{2-12}$ alkyl group substituted with an alkoxyl group having 2 to 12 carbon atoms include 3-ethoxy-n-propyl group, propoxypropyl group, 4-propoxy-n-butyl group, 3-methyl-n-hexyloxyethyl group, and 3-(2-ethylhexyloxy)propyl group. Examples of the phenyl group substituted with an alkyl group having 1 to 20 carbon atoms include o-isopropylphenyl group. Examples of the $C_{1-20}$ alkyl group substituted with phenyl group include DL-1-phenylethyl group, benzyl group, and 3-phenyl-n-butyl group.

Examples of the alkyl group having 2 to 12 carbon atoms represented by $R^{380}$ in the general formula (3-1) and $R^{390}$ in the general formula (3-2) include ethyl group, propyl group, n-hexyl group, n-nonyl group, n-decyl group, n-dodecyl group, 2-ethylhexyl group, 1,3-dimethylbutyl group, 1-methylbutyl group, 1,5-dimethylhexyl group, and 1,1,3,3-tetramethylbutyl group. Examples of the $C_{2-12}$ alkylene group represented by $R^{381}$ or $R^{391}$ include dimethylene group, trimethylene group, tetramethylene group, pentamethylene group and hexamethylene group.

Examples of the dye (III) include C. I. Acid Red 289. These are used singly or in combination. These dyes (III) have their absorption maximum at a wavelength within the range of from 500 to 600 nm.

When the dye (III) is used, the amounts of the dye (III) comprised in the blue filter is controlled so that transmittance of the filter is 15% or less at a wavelength of 535 nm. Concretely, the content of a dye (III) per a total of 100 parts by weight of the dye (I) and the dye (II) is usually 70 parts by weight or less, preferably 15 to 50 parts by weight. When the content of the dye (I) is less than 15 parts by weight, improvement of the spectroscopic characteristics becomes insufficient and it tends to be difficult that transmittance of the filter is 15% or less at a wavelength of 535 nm.

The color filter array of the invention can be produced by an ordinary color resist method. For example, it can be produced by a process comprising the step of patterning a photosensitive resin composition containing colorants. The photosensitive resin composition contains the dye (I). The amounts of the dye (I) contained in the photosensitive resin composition is the same as those in the desired blue filter layer. If the blue filter layer is desired to contain other dyes, for example, the dye (II) and the dye (III), a photosensitive resin composition containing the dye (II) and the dye (III) is employed. The amounts of the dye (II) and the dye (III) contained in the photosensitive resin composition are the same as those in the desired blue filter layer. The transmittance of the blue filter layer after the patterning is 70% or more at 450 nm and 5% or less at 650 nm.

The photosensitive resin composition may be a positive photosensitive resin composition or a negative photosensitive resin composition.

The positive photosensitive resin composition of the invention contains, for example, a photoactive compound and an alkali-soluble resin in addition to the above-described dyes.

A photoactive compound used in conventional photosensitive resin compositions can be used in the positive photosensitive resin composition of the invention. Examples thereof include esters of phenolic compounds with o-naphthoquinonediazide sulfonates. Examples of the phenolic compounds include compounds represented by the chemical formula (10).

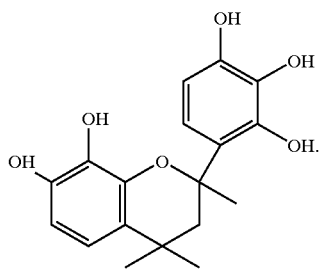
(10)

As the o-naphthoquinonediazide sulfonates, o-naphthoquinonediazide-5-sulfonate and o-naphthoquinonediazide-4-sulfonate can be exemplified.

The term "alkali-soluble resin" refers to resins that dissolve in alkaline developers, and any alkali-soluble resin similar to those used in conventional photosensitive resin compositions can be employed. Examples of such alkali-soluble resins include novolak resins such as those of p-cresol novolak resins, novolak resins of p-cresol and m-cresol; novolak resins having the structure represented by the formula (20):

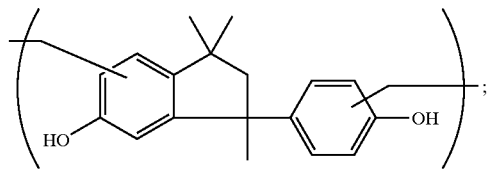
(20)

polyvinylphenol; and copolymers of styrene with vinylphenol. Preferably, a novolak resin is employed as the alkali-soluble resin.

The amounts of the dyes, the photoactive compound, and the alkali-soluble resin comprised in the photosensitive resin composition are usually 10 to 50 parts by weight, 10 to 50 parts by weight and 3 to 80 parts by weight, per a total of 100 parts by weight of the dyes, photoactive compound, and alkali-soluble resin, respectively.

Into the positive photosensitive resin composition, a curing agent may be incorporated. Incorporation of the curing agent improves the mechanical strength of the pattern formed by using the photosensitive resin composition.

As the curing agent, usually, a heat curing agent which is cured through heating is employed. Examples of the heat curing agent include compounds represented by the general formula (30):

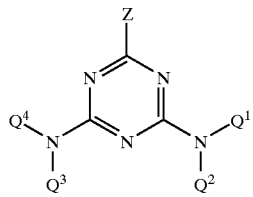
(30)

wherein $Q^1$, $Q^2$, $Q^3$, and $Q^4$ each independently represents a hydrogen atom, a hydroxyalkyl group having 1 to 4 carbon atoms, or an alkyl group having 1 to 4 carbon atoms and substituted with an alkoxyl group having 1 to 4 carbon atoms; Z represents a phenyl group or a group represented by the general formula (31):

$$Q^5Q^6N— \quad (31)$$

wherein $Q^5$ and $Q^6$ each independently represents a hydrogen atom, a hydroxyalkyl group having 1 to 4 carbon atoms, or an alkyl group having 1 to 4 carbon atoms and substituted with an alkoxyl group having 1 to 4 carbon atoms with the proviso that at least one of $Q^1$ to $Q^6$ is a hydroxyalkyl group having 1 to 4 carbon atoms or an alkyl group having 1 to 4 carbon atoms and substituted with an alkoxyl group having 1 to 4 carbon atoms.

with the proviso that at least one of $Q^1$ to $Q^6$ is a hydroxyalkyl group having 1 to 4 carbon atoms or an alkyl group having 1 to 4 carbon atoms and substituted with an alkoxyl group having 1 to 4 carbon atoms.

Examples of the hydroxyalkyl group having 1 to 4 carbon atoms include hydoxymethyl group, hydroxyethyl group, hydroxypropyl group, and hydroxybutyl group. Examples of the alkyl group having 1 to 4 carbon atoms and substituted with an alkoxyl group having 1 to 4 carbon atoms include methoxymethyl group, methoxyethyl group, ethoxyethyl group, and propoxybutyl group.

An example of the compound represented by the general formula (30) is hexamethoxymethylmelamine.

Moreover, compounds of the following chemical formulae (32) to (37) can be used as the curing agent in the positive photosensitive resin composition of the present invention, for example.

(32)

[chemical structure: benzene ring with CH₂OH, OH, CH₂OH substituents and a methyl group]

(33)

[chemical structure: benzene ring with CH₂OH, OH, CH₂OH substituents and a tert-butyl group]

(34)

[chemical structure: cyclic compound with four N atoms bearing CH₂OCH₃ groups and two C=O groups]

(35)

[chemical structure: six-membered ring with two N atoms bearing CH₂OCH₃ groups and C=O]

(36)

[chemical structure: six-membered ring with two N atoms bearing CH₂OCH₃ groups, C=O, and O in ring]

(37)

[chemical structure: six-membered ring with three N atoms, two bearing CH₂OCH₃, one bearing C₂H₅, and C=O]

When the curing agent is used, its content is usually not less than 10 parts by weight and not more than 35 parts by weight per a total of 100 parts by weight of the dyes, the photoactive compound, and the alkali-soluble resin.

The positive photosensitive resin composition of the present invention is usually diluted with a solvent.

The solvent is suitably selected according to the solubilities of the dye (I), dye (II), dye (III), photoactive compound, alkali-soluble resin, and curing agent, especially according to the solubilities of the dye (I), dye (II) and dye (III). For example, methyl cellosolve, ethyl cellosolve, methyl cellosolve acetate, ethyl cellosolve acetate, diethylene glycol dimethyl ether, ethylene glycol monoisopropyl ether, propylene glycol monomethyl ether, N-methylpyrrolidone, γ-butyrolactone, dimethyl sulfoxide, N,N'-dimethylformamide, cyclohexane, ethyl acetate, n-butyl acetate, propylene glycolmonoethyl ether acetate, ethyl acetate, ethyl pyruvate, ethyl lactate, or the like can be employed. These solvents are used either singly or in combination.

The amount of the solvent to be used is usually about 180 to 400 parts by weight per a total of 100 parts by weight of the dyes, photoactive compound, alkali-soluble resin, and curing agent.

The negative photosensitive resin composition of the present invention comprises, for example, a photoreactive acid generator, a curing agent, and an alkali-soluble resin, in addition to the dyes described above.

A photoreactive acid generator use in conventional negative photoreactive resin compositions can be employed as the photoreactive acid generator used in the negative photosensitive resin composition of the present invention. Examples thereof include compounds represented by the general formula (40):

(40)

[chemical structure: Q⁸–C(CN)=N–O–SO₂–phenyl–Q⁷]

wherein $Q^7$ represents an alkyl group having 1 to 3 carbon atoms, and $Q^8$ represents a phenyl group substituted with an alkyl group having 1 to 3 carbon atoms or a phenyl group substituted with an alkoxyl group having 1 to 3 carbon atoms.

Examples of the alkyl group having 1 to 3 carbon atoms represented by $Q^7$ include methyl group, ethyl group, and propyl group. An example of the phenyl group substituted with an alkyl group having 1 to 3 carbon atoms and represented by $Q^8$ is o-isopropylphenyl group. Examples of the phenyl group substituted with an alkoxyl group having 1 to 3 carbon atoms include p-methoxyphenyl group, p-ethoxylphenyl group, and p-propoxyphenyl group.

Moreover, compounds represented by the chemical formulae (41) to (47):

(41)

[chemical structure: diphenyliodonium PF₆⁻]

(42)

[chemical structure: diphenyliodonium BF₄⁻]

(43)

[chemical structure: diphenyliodonium CF₃SO₃⁻]

(44)

[chemical structure: (4-methoxyphenyl)(phenyl)iodonium S₆F₆⁻]

(45)

[chemical structure: triphenylsulfonium PF₆⁻]

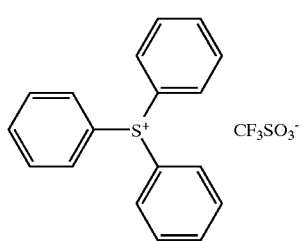
(46)

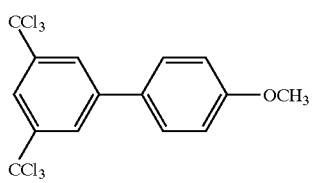
(47)

can also be used as the photo acid generator, for example.

As the curing agent, a heat curing agent which is cured through heating is usually employed as in the case of conventional negative photosensitive resin composition. The heat curing agents listed above as examples for the positive photosensitive resin composition can also be employed in the negative photosensitive resin composition of the present invention.

The alkali-soluble resins listed above as examples for the positive photosensitive resin composition can also be employed in the negative photosensitive resin composition of the present invention, as in the case of conventional negative photosensitive resin composition.

The amounts of the photo acid generator, curing agent, and alkali-soluble resin comprised in the negative photosensitive resin composition per a total of 100 parts by weight of the dyes, photoreactive acid generator, curing agent, and alkali-soluble resin are as follows. The content of the dyes is usually about 15 to 40 parts by weight, and that of the photo acid generator is usually 0.3 to 5 parts by weight. The amount of the curing agent to be used is usually 10 to 25 parts by weight, and the content of the alkali-soluble resin is usually 20 to 75 parts by weight.

The negative photosensitive resin composition is usually diluted with a solvent.

The solvent is selected according to the solubilities of the dye (I), dye (II), dye (III), photo acid generator, alkali-soluble resin, and curing agent, especially according to the solubilities of the dye (I), dye (II) and dye (III). The solvent listed above as examples for the positive photosensitive resin composition can be employed. The amount of the solvent to be used is usually about 180 to 400 parts by weight per a total of 100 parts by weight of the dyes, photo acid generator, curing agent, and alkali-soluble resin.

Since the above-described photosensitive resin composition employs the dye (I) and the dye (II) as its colorants, almost no precipitate is generated even if the composition is stored for a long period of time. Consequently, the composition can be applied onto the substrate practically without irregularities. This makes it possible to provide a color filter array having a blue filter layer with a pattern of about 0.5 to 2 μm in thickness and about 2 to 20 μm in length of each side.

The patterning is effected, for example, by providing a coat of the above-described resin composition on a substrate, exposing the coat to light, and then developing.

The coat is provided on the substrate by applying a diluted photosensitive resin composition thereto. The composition is usually applied by spin coating. After the composition has been applied onto the substrate, the coat is heated up to, for example, about 80 to 130° C. to evaporate the solvent comprised therein. Thus, a coat of the photosensitive resin composition is obtained.

Thereafter, the coat is exposed to light. The exposure to light involves the use of a mask pattern corresponding to the desired pattern, and is effected by irradiating the coat with a beam through the mask pattern. As the beam for the exposure of the coat to light, for example, a g-ray, an i-ray, or the like can be employed. Such exposure equipment as a g-ray stepper or an i-ray stepper may be employed for the exposure. When a negative photosensitive resin composition is used, the coat is heated after the exposure to light. When the positive photosensitive resin composition is used, the coat may be heated after the exposure or may not be heated. On heating the coat, the heating temperature is, for example, about 80 to 150° C.

After having been exposed to light, the coat is subjected to development. The development is effected by immersing the substrate provided with the coat in a developer, as in the case of the use of an ordinary photosensitive resin composition. Developer used for patterning conducted by using a conventional photosensitive resin composition can also be employed for patterning in the invention. A color filter array having a blue filter layer defined in the desired pattern can be obtained by taking the substrate out of the developer and then washing with water to remove the developer.

When a positive photosensitive resin composition is used, after having been washed with water, the substrate may be subjected to ultraviolet ray irradiation. Irradiation of ultraviolet rays can decompose the remaining photoactive compound and prevent coloration caused by the remaining photoactive compound. Moreover, when the photosensitive resin composition comprises a heat curing agent, the substrate may be heated after having been washed with water. By heating, the mechanical strength of the formed blue filter layer can be improved. The heating temperature is usually not lower than 160° C. and not higher than 220° C. Usually, the heating temperature is not higher than the decomposition temperatures of the dyes.

When a negative photosensitive resin composition is used, the substrate may be heated after having been washed with water. By heating, the mechanical strength of the formed blue filter layer is improved. The heating temperature is usually not lower than 160° C. and not higher than 220° C. Usually, the heating temperature is not higher than the decomposition temperatures of the dyes.

Thus, a blue filter layer in the desired pattern is formed. The other filter layers, that is, a red filter layer and a green filter layer are formed in the same plane of the substrate which has been provided with the blue filter layer, according, for example, to a conventional manner. When employing a positive photosensitive resin composition, it is preferred to employ one comprising a curing agent and carry out heating after development, for the strength of the formed blue filter layer is improved. The blue filter layer may be formed after the other color filter layers have been provided on the substrate.

Thus, a color filter array constituted of the red filter layer, green filter layer, and blue filter layer that are formed so as to be adjoining to each other in the same plane of the substrate can be obtained. The color filter array thus obtained is used for a solid-state image device, a liquid crystal display device, and the like. For instance, in the solid-state image device, if the color filter array is disposed on the front side of its charge-coupled device, color images excellent in color reproductivity, especially in the reproductivity of blue color, can be obtained.

The color filter array of the present invention shows excellent spectroscopic characteristics with respect to blue light and has a blue filter layer excellent in light fastness. Moreover, since dyes are employed as its colorants, the photosensitive resin composition to be employed for its production generates a less amount of precipitates and is excellent in store stability. As a result, a blue filter layer less in foreign matter content, and uniform in thickness can be produced with ease. This color filter array is favorably employed for use in a liquid crystal display device or a solid-state image device comprising a charge-coupled device.

Hereinafter, the invention will be described in more detail based on Examples, but these should by no means be construed as defining the scope of the present invention.

EXAMPLE 1

After 20 parts by weight of C. I. Acid Blue 83 as the dye (I), 10 parts by weight of C. I. Solvent blue 67 as the dye (II), 10 parts by weight of the ester of a phenolic compound represented by the chemical formula (10) with o-naphthoquinonediazide-5-sulfonate, as the photoactive compound, 30 parts by weight of a novolak resin of p-cresol as the alkali-soluble resin (weight average molecular weight in terms of polystyrene: 5,000), 15 parts by weight of hexamethoxymethylmelamine as the curing agent, and 300 parts by weight of ethyl lactate as the solvent had been mixed and dissolved, the resulting mixture was filtrated with a membrane filter having a pore size of 0.1 μm to provide a positive photosensitive resin composition.

Figures 3, 4:
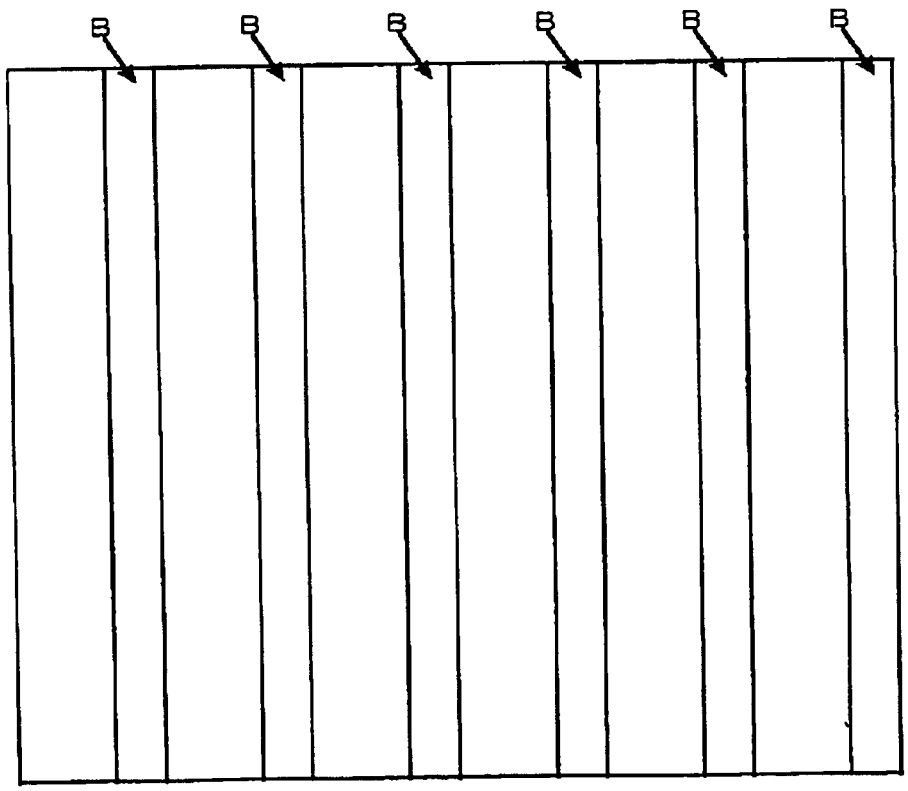
[FIG. 3]
[FIG. 4]

A coat was formed by applying the positive photosensitive resin composition obtained above onto a substrate (silicon wafer) by spin coating and heating at 100° C. for 1 minute to evaporate ethyl lactate therefrom. The coat had been exposed to light by irradiation of i-ray through a mask pattern using an exposure equipment ("Nikon NSR i7A" manufactured by Nikon Corp.). Then, the pattern was developed by immersing the coated substrate in a developer ("SOPD" manufactured by Sumitomo Chemical Co., Ltd.) at 23° C. for 1 minute. After the development, the substrate was washed with water, dried, irradiated with ultraviolet rays, and heated to 180° C. for 3 minutes to give a color filter array having a blue filter layer in a striped-pattern (FIG. 4). The blue filter layer has a line width of 1.0 μm and a thickness of 1.5 μm.

Figure 5:
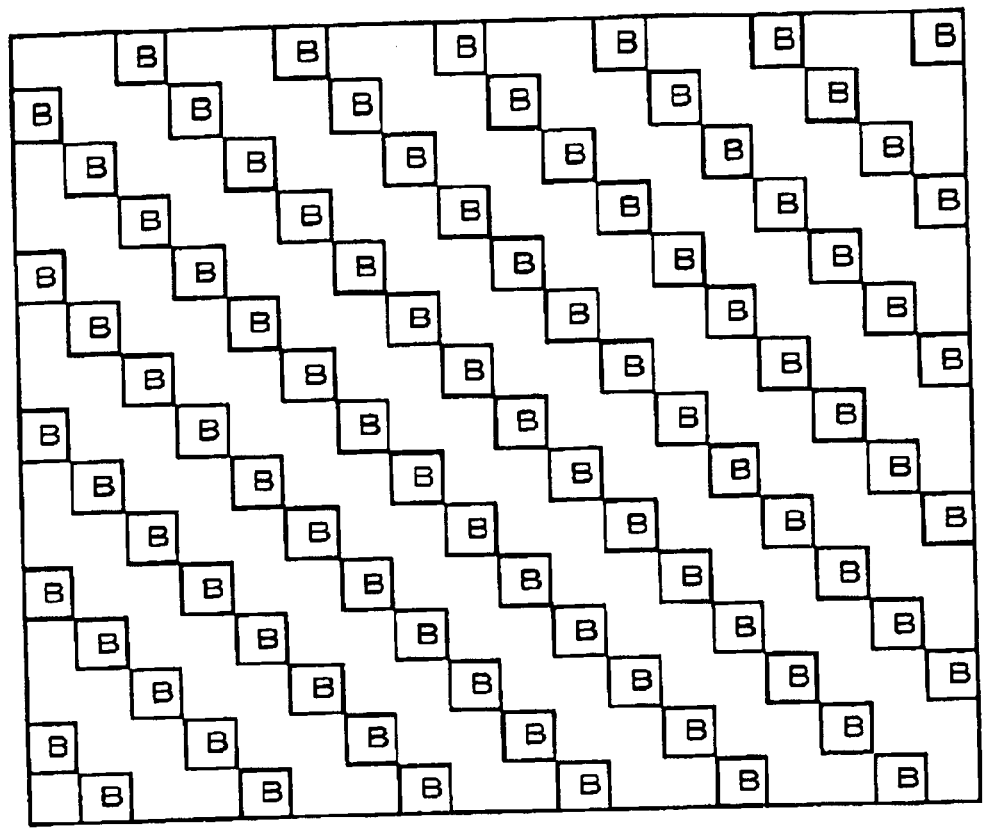
[FIG. 5]

Thereafter, except using a different mask pattern, the same procedure as above was repeated to give a color filter array having a blue filter layer formed in a mosaic pattern (FIG. 5). The blue filter layer has a line width of 2.0 μm and a thickness of 1.5 μm.

Except that a transparent glass plate was employed as the substrate in place of a silicon wafer and that the pattern was not exposed to light and not developed, the same procedure as above was repeated to give a blue filter layer formed in a thickness of 1.5 μm all over the substrate.

EXAMPLE 2

Except that C. I. Acid Blue 83 was replaced with 20 part by weight of C. I. Acid Blue 90 as the dye (I) and 3 part by weight of the compound represented by the formula (52):

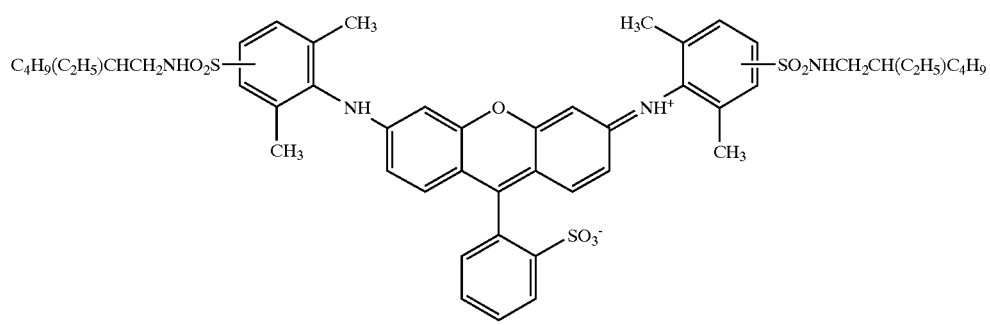

(52)

was used as the dye (III), the same procedure as in Example 1 was repeated to give a color filter array having a striped-pattern blue filter layer with a line width of 1.0 μm and a thickness of 1.5 μm, a color filter array having a mosaic-pattern blue filter layer with a line width of 2.0 μm and a thickness of 1.5 μm, and a blue filter layer formed in a thickness of 1.5 μm all over the substrate.

EXAMPLE 3

Except that 2 parts by weight of a compound represented 20 by the chemical formula (51):

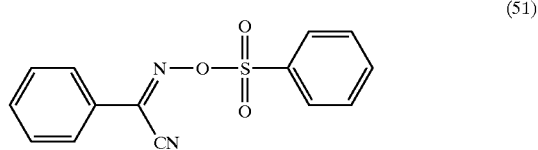

(51)

as the photo acid generator is used in place of the photoactive compound, the same procedure as in Example 1 was repeated to obtain a negative photosensitive resin composition.

A coat was formed by applying the negative photosensitive resin composition obtained above onto a substrate (silicon wafer) by spin coating and heating at 100° C. for 1 minute to evaporate ethyl lactate therefrom. The coat had been exposed to light by irradiation of i-ray through a mask pattern using an exposure equipment ("Nikon NSR i7A" manufactured by Nikon Corp.), followed by heating at 120° C. for 1 minute. Then, the pattern was developed by immersing the coated substrate in a developer ("SOPD" manufactured by Sumitomo Chemical Co., Ltd.) at 23° C. for 1 minute. After the development, the substrate was washed with water, dried, irradiated with ultraviolet rays, and heated to 180° C. for 3 minutes to give a color filter array having a blue filter layer in a striped-pattern. The blue filter layer has a line width of 1.0 μm and a thickness of 1.5 μm.

Thereafter, except using a different mask pattern, the same procedure as in Example 1 was repeated to give a color filter array having a blue filter layer formed in a mosaic pattern. The blue filter layer has a line width of 2.0 μm and a thickness of 1.5 μm.

Except that a transparent glass plate was employed as the substrate in place of a silicon wafer and that the exposure to light was conducted without using the mask pattern, the same procedure as in Example 1 was repeated to give a blue filter layer formed in a thickness of 1.8 μm all over the substrate.

EXAMPLE 4

Except that the dye (II) was not used and the amount of the dye (I) was changed to 50 parts by weight, the same procedure as in Example 1 was repeated to give a color filter array having a striped-pattern blue filter layer with a line width of 1.0 μm and a thickness of 1.5 μm, a color filter array having a mosaic-pattern blue filter layer with a line width of 2.0 μm and a thickness of 1.5 μm, and a blue filter layer formed in a thickness of 1.5 μm all over the substrate.

EXAMPLE 5

A photosensitive resin composition for forming a green filter layer, a photosensitive resin composition for forming a red filter layer, and a photosensitive resin composition for forming a blue filter layer were prepared according to the respective blending formulations shown below.

| (Photosensitive resin composition for forming a red filter layer) | |
|---|---|
| Novolak resin | 5 parts by weight |
| o-naphthoquinonediazide-4-sulfonate | 8 parts by weight |
| Hexamethoxymethylmelamine | 2 parts by weight |
| Ethyl lactate | 50 parts by weight |
| N,N'-dimethylformamide | 25 parts by weight |
| A compound represented by the chemical formula (52) | 2 parts by weight |
| C.I. Solvent Orange 56 | 2 parts by weight |
| C.I. Solvent Yellow 82 | 2 parts by weight |
| C.I. Solvent Yellow 162 | 2 parts by weight |
| (Photosensitive resin composition for forming a blue filter layer) | |
| Novolak resin | 5 parts by weight |
| o-naphthoquinonediazide-4-sulfonate ester | 8 parts by weight |
| Hexamethoxymethylmelamine | 2 parts by weight |
| Ethyl lactate | 50 parts by weight |
| N,N'-dimethylformamide | 25 parts by weight |
| A compound represented by the chemical formula (52) | 3 parts by weight |
| C.I. Solvent Blue 25 | 3 parts by weight |
| C.I. Acid Blue 90 | 2 parts by weight |
| (Photosensitive resin composition for forming a green filter layer) | |
| Novolak resin | 5 parts by weight |
| o-naphthoquinonediazide-4-sulfonate ester | 8 parts by weight |
| Hexamethoxymethylmelamine | 2 parts by weight |
| Ethyl lactate | 50 parts by weight |
| N,N'-dimethylformamide | 25 parts by weight |
| C.I. Solvent Blue 25 | 4 parts by weight |
| C.I. Solvent Yellow 82 | 2 parts by weight |
| C.I. Solvent Yellow 162 | 2 parts by weight |

The photosensitive resin composition for forming a red filter layer prepared above had been applied onto a silicon wafer provided with a charge-coupled device constituted of a over coating film (3), a polysilicon electrode (4), a sensor (5), a V resistor (6), a light-shielding film (7), and a passivation film (8) by spin coating. Then, its solvent was evaporated off on a baking plate at 100° C.

Thereafter, using an i-ray stepper exposure equipment ("Nikon NSR2205 i12D" manufactured by Nikon Corp.), the substrate was irradiated with an ultraviolet ray of a wavelength of 365 nm through a reticle (2,000 mJ/cm$^2$). Then, the substrate was subjected to development by a developing agent (an aqueous solution containing 30 g of tetramethylammonium hydroxide per 1,000 cm$^3$). After the exposed portion had been removed, the substrate was washed with pure water. Thereafter, using a low-pressure mercury lamp (3,000 mJ/cm$^2$), ultraviolet rays were irradiated all over the substrate, and the substrate was then heated on a baking plate at 180° C. for 10 minutes to form a red filter layer (FIG. 6(a)).

Figure 6:
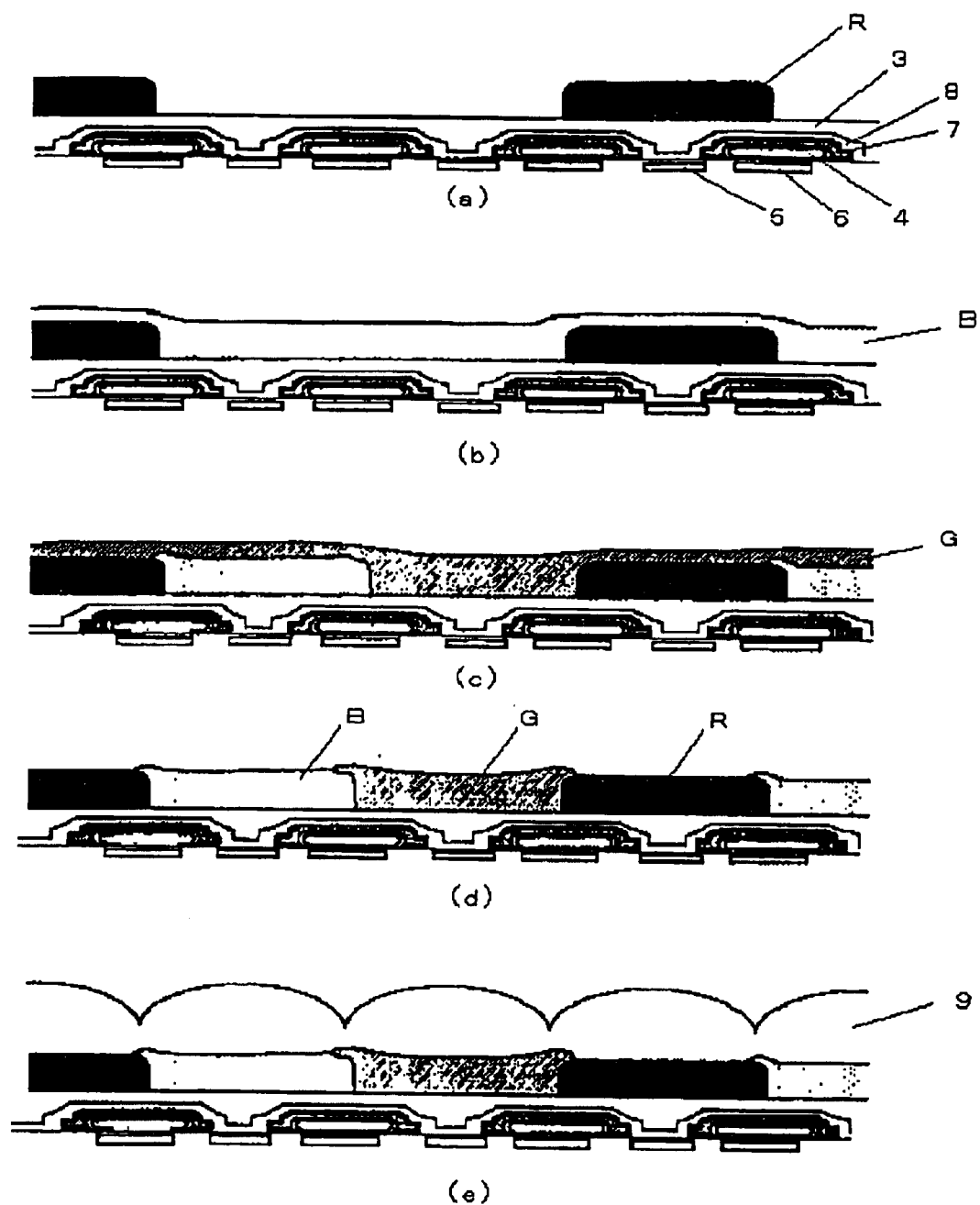
[FIG. 6]

Except for using the photosensitive resin composition for forming a blue filter layer prepared above instead of the photosensitive resin composition for forming a red filter layer, the same procedure as above was repeated to form a blue filter layer (FIG. 6(b)).

Except for using the photosensitive resin composition for forming a green filter layer prepared above, the same procedure as above was repeated to form a green filter layer and consequently a color filter array (FIGS. 6(c), (d)).

A microlens was formed on the color filter array in a conventional manner to give a solid-state image device. The thickness of the blue filter layer of the color filter array at the solid-state image device was 1.7 μm. The color filter array at this solid-state image device showed good spectroscopic characteristics (FIG. 6(e)).

In the same manner as that described above, a blue filter layer (thickness: 1.7 μm) was formed all over a quartz wafer.

Evaluation (1) Spectroscopic Characteristics

The color filter arrays each provided with a blue filter layer all over its substrate and obtained in Examples and Comparative Example were subjected to measurement of light transmittance at 450 nm, 535 nm, and 650 nm. The results are shown in Table 1.

(2) Light Fastness

An ultraviolet ray-blocking filter ("colored optical glass L38" manufactured by Hoya Corp. Capable of blocking light of a wavelength of 380 nm or shorter) was disposed in front of each of the color filter arrays obtained in Examples and provided with a blue filter layer all over its substrate, followed by irradiating light at 1,000,000 lx·hour. "Sun tester XF 180 CPS" manufactured by Shimadzu Corp. was employed as the light source. The light transmittance of each color filter array after the irradiation was measured at a wavelength of 450 nm, 535 nm, and 650 nm. The results are shown in Table 2.

TABLE 1

| Wavelength | Light transmittance (%) | | |
|---|---|---|---|
| (nm) | 450 | 535 | 650 |
| Example 1 | 74 | 17 | 3.4 |
| Example 2 | 75 | 5 | 2.8 |
| Example 3 | 72 | 18 | 1.8 |
| Example 4 | 74 | 11 | 2.0 |

TABLE 2

| Wavelength (nm) | Light transmittance (%) | | |
|---|---|---|---|
| | 450 | 535 | 650 |
| Example 1 | 72 | 22 | 4.5 |
| Example 2 | 72 | 6 | 4.0 |
| Example 3 | 69 | 23 | 3.0 |
| Example 4 | 62 | 15 | 6.0 |

What is claimed is:

1. A photosensitive resin composition comprising:
a triallylmethane dye showing its absorption maximum at a wavelength within a range of from 550 to 650 nm; and
a copper phthalocyanine dye having its absorption maximum at a wavelength of 600 to 700 nm.

2. The photosensitive resin composition according to claim 1, wherein an amount of the triallylmethane dye is 30 to 70 parts by weight per a total of 100 parts by weight of the triallylmethane dye and the copper phthalocyanine dye.

3. The photosensitive resin composition according to claim 1, that further comprises a xanthene dye having its absorption maximum at a wavelength of 500 to 600 nm.

4. The photosensitive resin composition according to claim 3, wherein an amount of the triallylmethane dye is 30 to 70 parts by weight and an amount of the xanthene dye is 70 parts by weight or less per a total of 100 parts by weight of the copper phthalocyanine dye and the xanthene dye.

5. A photosensitive resin composition comprising:
a triallylmethane dye showing its absorption maximum at a wavelength within a range of from 550 to 650 nm;
a photoactive compound; and
an alkali-soluble resin,
wherein amounts of the dye, the photoactive compound, and the alkali-soluble resin are 10 to 50 parts by weight, 10 to 50 parts by weight, and 3 to 80 parts by weight, per a total of 100 parts by weight of the dye, photoactive compound, and alkali-soluble resin, respectively.

6. The photosensitive resin composition according to claim 5 which further comprises a curing agent, and wherein an amount of the curing agent is not less than 10 parts by weight and not more than 35 parts by weight per a total of 100 parts by weight of the dye, the photoactive compound, and the alkali-soluble resin.

7. A photosensitive resin composition comprising:
a triallylmethane dye showings its absorption maximum at a wavelength within a range of from 550 to 650 nm;
a photo acid generator;
a curing agent; and
an alkali-soluble resin,
wherein amounts of the dye, the photo acid generator, the curing agent, and the alkali-soluble resin are about 15 to 40 parts by weight, 0.3 to 5 parts by weight, 10 to 25 parts by weight, and 20 to 75 parts by weight, per a total of 100 parts by weight of the dye, photoreactive acid generator, curing agent, and alkali-soluble resin, respectively.

* * * * *